United States Patent
Hussain et al.

(10) Patent No.: US 10,479,478 B2
(45) Date of Patent: Nov. 19, 2019

(54) COMPOSITE MATERIAL SUITABLE FOR A MORPHING SKIN

(71) Applicants: MBDA UK Limited, Stevenage (GB); Imperial College of Science, Technology and Medicine, South Kensington (GB)

(72) Inventors: Mohammed Azad Hussain, Stevenage (GB); Anthony Machell, Stevenage (GB); Paul Robinson, South Kensington (GB); Henry Alexander Maples, South Kensington (GB); Charnwit Tridech, South Kensington (GB); Alexander Bismarck, South Kensington (GB)

(73) Assignees: MBDA UK Limited, Stevenage (GB); Imperial College of Science, Technology and Medicine, South Kensington (GB)

( * ) Notice: Subject to any disclaimer, the term of this patent is extended or adjusted under 35 U.S.C. 154(b) by 317 days.

(21) Appl. No.: 13/989,453

(22) PCT Filed: Mar. 28, 2013

(86) PCT No.: PCT/GB2013/050826
§ 371 (c)(1),
(2) Date: May 24, 2013

(87) PCT Pub. No.: WO2013/144639
PCT Pub. Date: Oct. 3, 2013

(65) Prior Publication Data
US 2015/0136910 A1    May 21, 2015

(30) Foreign Application Priority Data

Mar. 30, 2012 (EP) .................................... 12275031
Mar. 30, 2012 (GB) ................................... 1205710.5

(51) Int. Cl.
*B64C 3/38* (2006.01)
*B64C 3/48* (2006.01)
(Continued)

(52) U.S. Cl.
CPC ................ *B64C 3/48* (2013.01); *B29C 61/00* (2013.01); *B29C 70/086* (2013.01);
(Continued)

(58) Field of Classification Search
CPC .... B64C 3/18; B64C 3/52; B64C 3/44; B29C 61/06; B29C 70/88
(Continued)

(56) References Cited

U.S. PATENT DOCUMENTS 3,930,626 A    1/1976  Croswell, Jr.
5,366,801 A *  11/1994 Bryant ................. D06N 3/0059
                                                 428/305.5
(Continued)

FOREIGN PATENT DOCUMENTS

DE   102004008337 A1 *  9/2005  ............. C22C 47/20
EP       2113649 A2    11/2009
(Continued)

OTHER PUBLICATIONS

European Search Report dated Aug. 22, 2012 for European Application No. 12275031.8.
(Continued)

*Primary Examiner* — Medhat Badawi
*Assistant Examiner* — Vincente Rodriguez
(74) *Attorney, Agent, or Firm* — Scully Scott Murphy and Presser

(57) ABSTRACT

A morphing skin for an air vehicle structure, the skin being formed by a composite material which includes: a multiplicity of fibers, a matrix incorporating the fibers, and a thermo-sensitive material, such as a thermo-plastic. The
(Continued)

thermo-sensitive material can be reversibly transitionable in response to a change in temperature, between (i) an ambient temperature mode in which the thermo-sensitive material is capable of transferring loads in the composite material, and (ii) a heated mode in which the ability of the thermo-sensitive material to transfer the loads is reduced. This can allow the stiffness of the skin to be temporarily reduced to enable the skin to be morphed into a different shape.

15 Claims, 3 Drawing Sheets

(51) Int. Cl.
 B64C 3/20 (2006.01)
 B29C 70/08 (2006.01)
 B29C 70/20 (2006.01)
 B29C 61/00 (2006.01)
 C08L 33/26 (2006.01)
 C08L 63/00 (2006.01)
 B64C 3/44 (2006.01)

(52) U.S. Cl.
 CPC .............. *B29C 70/205* (2013.01); *B64C 3/20* (2013.01); *C08L 33/26* (2013.01); *C08L 63/00* (2013.01); *B64C 2003/445* (2013.01); *Y02T 50/43* (2013.01)

(58) Field of Classification Search
 USPC ........................................................ 244/133
 See application file for complete search history.

(56) References Cited

U.S. PATENT DOCUMENTS

| | | | | |
|---|---|---|---|---|
| 5,662,294 | A * | 9/1997 | MacLean et al. | 244/219 |
| 7,798,443 | B2 * | 9/2010 | Hamilton et al. | 244/99.8 |
| 7,892,630 | B1 * | 2/2011 | McKnight | B32B 3/10 428/114 |
| 7,897,225 | B2 * | 3/2011 | Campbell | B29C 61/10 428/158 |
| 7,901,524 | B1 | 3/2011 | McKnight et al. | |
| 8,071,171 | B1 * | 12/2011 | Doty et al. | 427/272 |
| 8,703,568 | B2 * | 4/2014 | Babcock et al. | 438/289 |
| 2002/0040900 | A1 * | 4/2002 | Arx | A47J 36/2483 219/544 |
| 2004/0086699 | A1 | 5/2004 | Schneider | |
| 2004/0117955 | A1 * | 6/2004 | Barvosa-Carter | A44B 18/0007 24/442 |
| 2005/0070185 | A1 * | 3/2005 | Schneider | 442/164 |
| 2007/0107527 | A1 | 5/2007 | Ogisu et al. | |
| 2007/0262201 | A1 * | 11/2007 | Cox | B64C 30/00 244/126 |
| 2008/0314510 | A1 * | 12/2008 | Hood | B29C 35/0272 156/221 |
| 2009/0130391 | A1 * | 5/2009 | Taya | B29C 61/0608 428/172 |
| 2009/0301094 | A1 | 12/2009 | Webster | |
| 2010/0025538 | A1 | 2/2010 | Hamilton et al. | |
| 2010/0282906 | A1 * | 11/2010 | Sanderson et al. | 244/123.1 |
| 2011/0001018 | A1 | 1/2011 | Hamilton et al. | |
| 2011/0083431 | A1 * | 4/2011 | Mankame | F03G 7/065 60/527 |
| 2011/0084174 | A1 | 4/2011 | Hemmelgarn et al. | |
| 2011/0203288 | A1 | 8/2011 | Turner et al. | |
| 2011/0300358 | A1 * | 12/2011 | Blohowiak | B32B 5/12 428/215 |

FOREIGN PATENT DOCUMENTS

| | | |
|---|---|---|
| GB | 2445099 A | 6/2008 |
| JP | 2000-238163 A | 9/2000 |
| WO | WO 2009/137143 A1 | 11/2009 |

OTHER PUBLICATIONS

Great Britain Search Report dated Jul. 19, 2012 for GB Application No. 1205710.5.
P. Bettini et al., Carbon Fiber Reinforced Smart Laminates with Embedded SMA Actuators—Part I: Embedding Techniques and Interface Analysis, Journal of Materials Engineering and Performance, vol. 18, No. 5-6, Aug. 1, 2009, pp. 664-671.
Smart wires change wing's shape in flight, Reinforced Plastics, Elsevier Advanced Technology, New York, NY, vol. 39, No. 2, Feb. 1, 1995, pp. 7.
International Search Report dated Jan. 8, 2013 issued in PCT/GB2013/050826.

\* cited by examiner

COMPOSITE MATERIAL SUITABLE FOR A MORPHING SKIN

FIELD OF THE INVENTION

The present invention relates to composite materials, and especially, but not necessarily exclusively, to composite materials for use in a morphing skin on an air vehicle, and a vehicle incorporating such a morphing skin.

BACKGROUND ART

Control of air vehicles is often achieved using discrete control elements such as flaps, slats, ailerons etc. Various arrangements have also been suggested for changing the aerodynamic profile of components, such as a wing, without employing a discrete element. These arrangements, in which the overall profile of the component is altered, are often referred to as 'morphing skin' designs. Morphing skins may provide many advantages such as a reduction of the complexity of the high-lift systems, decrease in maintenance expenses and the supply of a lighter system for air vehicles which leads to reductions in operating costs, e.g. fuel. In addition, more environmentally friendly air vehicles could also be achieved because of lower emissions of pollutant gases such as $CO_2$ and $NO_x$ due to lower fuel consumption.

Several morphing skin concepts and technologies have been suggested: In a first example, the use of elastomers for a morphing skin has been suggested because their stretchable structures allows for a change in surface area, an important property required for morphing skins. However, elastomers are not suitable for carrying and transferring aerodynamic loads to the underlying structure because their tensile strength is only around 50 MPa. In another example, deployable materials such as rolling, collapsible, foldable and inflatable structures have been considered because they provide a change in surface area when they are actuated. However, like elastomers, they are also unable to cope in high load environments, such as aircraft wings. Moreover, it is difficult to achieve a smooth surface during deployment.

Some multi-stable composites have been suggested for use in morphing skins because they are able to change their shape due to stiffness controlling. However, aerodynamic loads tend to be greater than the forces required to change these multi-stable composites from one stable arrangement to the other, and the multi-stable composites have been found to therefore be unsuitable for morphing skins.

Shape memory materials such as shape memory alloys (SMA), shape memory polymers (SMP) and elastic memory composites (EMC) have also been suggested for use in morphing skins because their stiffness can be changed, which results in a shape change. Shape memory alloys (SMAs) have been found to provide a low actuation rate. Shape memory polymers (SMPs) have been found to have a low stiffness, durability, and toughness which means that it is difficult to use them as structural materials. Elastic memory composites (EMCs) also suffer from the same problems as SMPs. Reinforcing SMPs has been suggested to improve their stiffness but this has resulted in a reduction of maximum strain.

DISCLOSURE OF THE INVENTION

The present invention seeks to reduce, or eliminate, at least some of the above-mentioned disadvantages.

According to a first aspect of the invention, there is provided a morphing skin for an air vehicle structure, the skin being formed by a composite material comprising: a multiplicity of fibres, a matrix incorporating the fibres, and a thermo-sensitive material, wherein the thermo-sensitive material is reversibly transitionable in response to a change in temperature, between (i) an ambient temperature mode in which the thermo-sensitive material is capable of transferring loads in the composite material, and (ii) a heated mode in which the ability of the thermo-sensitive material to transfer the loads is reduced thereby reducing the stiffness of the skin. By reducing the stress transfer ability at the interface between the thermo-sensitive material and surrounding parts of the composite material, it has been found to be possible to temporarily reduce the stiffness of the skin. Such an arrangement may enable an air vehicle structure to have a skin structure of relatively high stiffness under normal operating conditions, whilst also enabling the skin to be temporarily softened such that it can be morphed into a different shape (upon heating the thermo-sensitive material). Since the thermo-sensitive material is reversibly transitionable between the heated and ambient temperatures modes, it can also revert to the ambient temperature mode in the morphed shape thereby providing a high stiffness (morphed) skin.

In the ambient temperature mode, the thermo-sensitive material typically transfers loads in the composite material with relatively low or negligible shear distortion of the thermo-sensitive material. In contrast, in the heated mode, the thermo-sensitive material typically transfers loads in the composite material with relatively larger shear distortion of the thermo-sensitive material. Thus, the load transfer ability of the thermo-sensitive material in the heated mode may be reduced in comparison to the load transfer ability in the ambient temperature mode. In the ambient temperature mode, the thermo-sensitive material preferably transfers the loads in the composite sufficiently for the skin to act as a relatively high stiffness surface (for example as an aerodynamic surface). In the heated mode, the ability of the thermo-sensitive material to transfer loads is preferably reduced such that the skin can be non-destructively, and reversibly, morphed into a different shape using an actuation force.

The use of heat in order to soften the skin has also been found to be advantageous because it provides a relatively simple way to enable morphing of the skin in comparison with known methods, for example involving the programming of shape memory materials.

The thermo-sensitive material is reversibly transitionable between the ambient temperature mode and the heated mode. It will be appreciated that in some embodiments the composite material may have slightly different properties when it reverts back to the ambient temperature having been in the heated mode. The thermo-sensitive material will, however, still transfer loads in the composite material better than in the heated mode and is therefore reversibly transitionable in accordance with the invention. After returning to the ambient temperature mode from a heated mode, the composite material preferably recovers more than 90%, and more preferably over 95%, and yet more preferably over 99%, of its stiffness compared to its preceding ambient temperature mode. The thermo-sensitive material is preferably repeatedly reversibly transitionable between the ambient temperature mode and the heated mode.

The thermo-sensitive material is preferably a polymer, and more preferably a thermoplastic. For example the polymer material may be poly(methyl methacrylate-co-acrylamide) or polystyrene. The polymer may be a liquid crystal polymer (LCP).

The thermo-sensitive material is preferably transitionable between two different states (also referred to as 'phases' for LCPs) across a transition temperature. In the heated mode the thermo-sensitive material is preferably at a temperature above a transition temperature, such that it has changed state (in comparison to its state in the ambient temperature mode). For example, the thermo-sensitive material may be transitionable from a high elastic modulus state (in ambient temperature mode) to a low elastic modulus state (in heated mode) across a transition temperature e.g. glass transition temperature (Tg). In ambient mode the thermo-sensitive material may be in a glass state, whereas in heated mode the thermo-sensitive material may be in a rubber state. Reference to the transition between different states of a material, especially a polymer, will be readily understood by the skilled person and is typified by changes in the physical properties of the material over a relatively small temperature range. The transition temperature is preferably higher than the maximum operating temperature of the air vehicle skin to avoid unintentional transition of the skin to the heated mode. The transition temperature may be more than 80° C., and preferably more than 100° C. The transition temperature may be in the range of 100° C. to 150° C. for aerospace applications.

The thermo-sensitive material may be transitionable between a multiplicity of different states across a multiplicity of transition temperatures (and thus into a respective multiplicity of heated modes).

The matrix preferably has a glass transition temperature (Tg) above, and preferably well above, the transition temperature of the thermo-sensitive material. This mitigates or avoids irreversible damage to the composite when the thermo-sensitive material is in heated mode. The matrix may be an epoxy matrix.

In embodiments in which the thermo-sensitive material is an LCP, the material may be transitionable between a plurality of different states (for example crystalline, liquid crystalline and isotropic liquid states) at a plurality of different transition temperatures. In embodiments in which the material is an LCP, the stiffness of the skin may therefore be able to be reduced in a plurality of discrete stages corresponding to the different states.

The ability of the thermo-sensitive material to respond to loads within the composite material has been found to be linked to the thermo-sensitive material's stress transfer ability at the interface with surrounding parts of the composite material. This is thought to be linked to the mechanical performance (e.g. the elastic modulus and/or strength) of the thermo-sensitive material and/or the bond strength at the interface between the materials. The elastic modulus of the thermo-sensitive material in ambient temperature mode is preferably between 0.001 GPa and 12 GPa, and more preferably between 0.01 GPa and 3 GPa The elastic modulus of the thermo-sensitive material in heated mode is preferably 50% or less of the elastic modulus of the thermo-sensitive material in ambient temperature mode. The elastic modulus of the thermo-sensitive material in heated mode may be negligible.

The flexural modulus of the composite material when the thermo-sensitive material is in heated mode may be 50% or less of the flexural modulus of the composite material when the thermo-sensitive material is in ambient temperature mode. The elastic modulus of the composite material when the thermo-sensitive material is in heated mode may be 50% or less of the elastic modulus of the composite material when the thermo-sensitive material is in ambient temperature mode. For these purposes, the properties when the thermo-sensitive material is in ambient temperature can be assessed at standard ambient temperature and pressure (25° C. and 100 kPa) and the properties in heated mode can be assessed at just above the transition temperature of the material.

In principle, the thermo-sensitive material may be arranged in any manner in the composite material that achieves the claimed function.

In some embodiments of the invention, the composite material includes a first layer comprising at least some of the multiplicity of fibres, and a second layer, adjacent the first layer, comprising the thermo-sensitive material. The first and second layers are preferably parallel. The layers are preferably substantially planar. The composite material may include a plurality of layers each of which comprise some of the fibres, the plurality of the layers being interleaved by layers of the thermo-sensitive material. The layer(s) comprising the fibres preferably also comprise the matrix (which preferably remains stiff when the thermo-sensitive material is heated). For example, the fibres are preferably incorporated into the matrix and then that pre-incorporated layer of matrix and fibres is interleaved adjacent a thermo-sensitive material layer. Embodiments in which the thermo-sensitive material is provided in a layer as described above, have been found to be capable of especially high bending deformation in heated mode. This is thought to be due to the thermo-sensitive material, when heated, allowing the adjacent layers of fibres or fibre/matrix to shear relative to one another. The above-mentioned layering of the thermo-sensitive material has also been found to be compatible with both arrangements in which the fibres are woven fibres and in which the fibres are uni-directional.

In another group of embodiments of the invention, the multiplicity of fibres are coated in the thermo-sensitive material. Such an arrangement has been found to provide especially high recovery of mechanical properties from the heated to the ambient temperature modes. The fibres may be coated by various methods such as electrocoating, plasma polymerisation and dip-coating. In this group of embodiments the composite material may, or may not, also include a layer of the thermo-sensitive material.

In principle, any fibre direction is possible, but in preferred embodiments of the invention, the fibres are uni-directional. Embodiments of the invention in which the fibres are coated in the thermo-sensitive material have been found to be especially effective in combination with uni-directional fibres.

In embodiments of the invention, softening of the thermo-sensitive material has a local effect rather than a homogeneous effect throughout the bulk composite, though allowing the bulk composite overall to change shape. The thermo-sensitive material is positioned as an interface between material portions that are not themselves thermo-sensitive. When softened, the thermo-sensitive material allows movement such as a shear or sliding movement at that interface, between those portions. It is this movement at an interface that allows the bulk composite as a whole to change shape. Thus where the composite is layered, incorporating at least one layer of thermo-sensitive material, the softened layer of thermo-sensitive material allows adjacent layers of matrix or fibre/matrix material to move, for example to slide or shear, relative to each other as the bulk composite structure is bent. Where reinforcing fibres are coated in the thermo-sensitive material and embedded into the matrix, the softened thermo-sensitive material allows the fibres to move relative to the matrix material so that the composite can be actuated into a different shape. In this case, the softened thermo-sensitive material reduces the effectiveness of the reinforcing fibres.

The skin preferably comprises, or is connectable to, a heating apparatus for heating the thermo-sensitive material from the ambient temperature mode to the heated mode. In principle, there are a variety of ways of heating the thermo-sensitive material (for example by applying heated pad to a skin surface, or placing hot exhaust pipes in proximity to the skin surface). In a preferred embodiment, the fibres are electrically conductive and the heating apparatus is arranged to pass a current through the fibres to thereby heat the thermo-sensitive material. For example the heating apparatus may comprise a switchable power source connected across the fibres.

The fibres are preferably reinforcing fibres, particularly carbon fibres. Carbon fibres are especially beneficial because they tend to provide the physical properties that are suitable for use on air vehicles (e.g. strength:weight ratio) and are also electrically conductive and can therefore be heated by passing an electric current through them if required (see above). The fibres may incorporate fibres of more than one material however, including both reinforcing fibres and electrically conductive fibres.

The morphing skin may be suitable for, or located on, an aerodynamic surface of the air vehicle structure (i.e. any surface that influences the aerodynamics of the structure or of another structure when assembled). For example, it may be part of a wing or other aerofoil structure, an engine air intake, or part of a fuselage. The skin or the associated air vehicle structure may comprise, or be connectable to, an actuator for morphing the skin, when the thermo-sensitive material is in the heated mode.

According to another aspect of the invention, there is provided an air-vehicle comprising the morphing skin described above with reference to the first aspect of the invention.

According to a another aspect of the invention, there is provided a composite material comprising a multiplicity of fibres, a matrix incorporating the fibres, and a thermo-sensitive material, wherein the thermo-sensitive material is reversibly transitionable in response to a change in temperature, between (i) an ambient temperature mode in which the thermo-sensitive material is capable of transferring loads in the composite material, and (ii) a heated mode in which the ability of the material to transfer the loads is reduced thereby reducing the stiffness of the composite material. Such a material may be useful in applications in which the material needs to be relatively stiff in normal operation, but in which it is desirable to be able to significantly change the shape of the material using a relatively low actuation force.

The composite material need not necessarily be used only on air-vehicles. For example the composite material may be used during manufacture of complex assemblies whereby a component may be deformed into a complex shape when the thermo-sensitive material is in the heated mode, and is then able to be cooled to form a stiff structure of that complex shape.

According to yet another aspect of the invention there is provided a method of morphing a skin on an air vehicle, comprising the steps of (i) heating the skin, the skin being arranged to reversibly reduce in stiffness in reaction to the increase in temperature, (ii) deforming the skin, and (iii) cooling the skin in the deformed state, the skin being arranged to return to a higher stiffness in reaction to the decrease in temperature. The skin may comprise a composite material comprising a multiplicity of fibres. The step of heating the skin may comprise the step of passing an electric current through the fibres.

According to yet another aspect of the invention, there is provided a method of manufacturing an article using a composite material, comprising the steps of (i) heating the composite material, the material being arranged to reduce in stiffness in reaction to the increase in temperature, (ii) deforming the material to form the composite component, and (iii) cooling the material in the deformed state, the material being arranged to return to a higher stiffness in reaction to the decrease in temperature.

There is also provided an article comprising a composite material, the composite material comprising a multiplicity of fibres, a matrix incorporating the fibres, and a thermo-sensitive material, wherein the thermo-sensitive material is reversibly transitionable in response to a change in temperature, between (i) an ambient temperature mode in which the thermo-sensitive material is capable of transferring loads in the composite material, and (ii) a heated mode in which the ability of the material to transfer the loads is reduced thereby reducing the stiffness of the composite material.

Any features described with reference to one aspect of the invention are equally applicable to any other aspect of the invention, and vice versa. For example, features described with reference to the morphing skin on the air vehicle are equally applicable to the, air-vehicle, the composite material per se, or to the method of morphing a skin.

BRIEF DESCRIPTION OF THE DRAWINGS

Example embodiments of the invention will now be described by way of example only and with reference to the accompanying drawings, of which.

DETAILED DESCRIPTION

Figure 1:
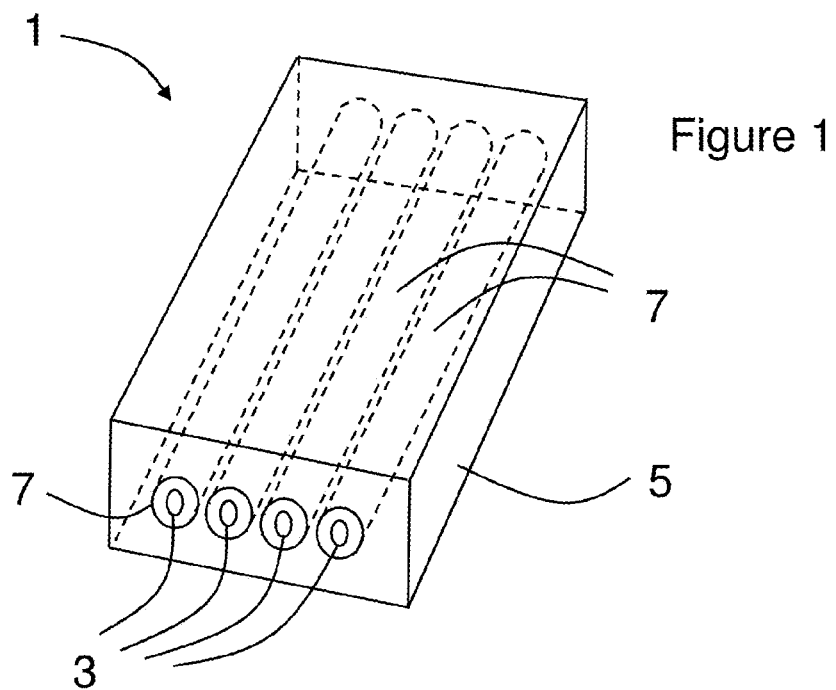
FIG. 1 is a schematic perspective view of a morphing skin according to a first embodiment of the invention.

FIG. 1 is a schematic view of a composite material 1 according to a first embodiment of the invention. The composite material 1 is for use on a morphing skin forming the outer surface of a wing of an air vehicle (not shown).

The composite material 1 comprises a plurality of unidirectional carbon fibres 3 incorporated into an epoxy matrix 5, and a thermo-sensitive material 7. As shown in FIG. 1, the surface of the fibres 3 is coated in the thermo-sensitive material 7 such that the thermo-sensitive material 7 forms an interface between the carbon fibres 3 and the matrix 5.

In the first embodiment of the invention, the thermo-sensitive material 7 is a poly(methyl methacrylate-co-acrylamide) copolymer (p(MMA-co-AAm)). MMA is the monomer for PMMA, an amorphous polymer with glass transition temperature (Tg) around 105-120° C. AAm was chosen as co-monomer as it was found to provide effective adhesion between carbon fibres and an epoxy matrix.

The composite material 1 was manufactured as follows:

(i) The p(MMA-co-AAm) copolymer was coated on carbon fibres in-situ. MMA and AAm were dissolved in dimethylformamide (DMF), then, lithium perchlorate (electrolyte salt) was added to the solution.

(ii) Carbon fibres (AS4 unsized 12 k, Hexcel) were passed continuously through a stainless-steel tube which was immersed in the electrolyte bath at constant processing speed (1.9 mm/s), fibre tension (150 g) and temperature (65° C.). Constant electric current (1.2 A) was applied to the setup during the electrocoating process. Carbon fibres were used as anode while the stainless-steel tube was the cathode.

(iii) The coated carbon fibres were washed thoroughly with acetone and distilled water to remove any trapped and unreacted monomers and extract any salt residue, then, they were dried overnight in a drying oven (55° C.).

(iv) Filament winding with constant tension and speed was used to wind the p(MMA-co-AAm) electrocoated carbon fibres onto a stainless steel plate which was covered with a release film. Mixed epoxy resin (Epoxy resin (LY556, Huntsman) and hardener (XB3473, Huntsman) was applied in between each layer of coated fibre laminates by brushing.

(v) Next, the laminates were placed into a resin infusion under flexible tooling (RIFT) setup in order to infuse more epoxy resin through the laminates under vacuum and also remove any air bubbles from the laminates. The coated fibre laminates were cured at 120° C. for 2 hours and 180° C. for 4 h under vacuum (−105 Pa).

The thermo-sensitive material 7 in the composite material 1 of the first embodiment is reversibly transitionable between a glass phase in an ambient temperature mode when it is below 114° C. (the glass transition temperature) and a rubber phase in a heated mode (when it is above the glass transition temperature). In the ambient temperature mode the thermo-sensitive material 7 is capable of transferring loads in the composite material, whereas in the heated mode the ability of the material 7 to transfer the loads is reduced.

This behaviour can be demonstrated in a flexural test (three point bending) using a piece (10 mm width×40 mm length×1.1 mm thickness): At room temperature, the thermo-sensitive material 7 (p(MMA-co-AAm)) is in ambient temperature mode and can transfer loads into the composite material 1. Accordingly, the flexural modulus of the p(MMA-co-AAm) electrocoated carbon fibre-epoxy composite is 85±7 GPa. When the composite 1 is heated to 130° C., which is above glass transition temperature (114° C.) of p(MMA-co-AAm), the thermo-sensitive material 7 transitions into a heated mode in which its ability to transfer loads to the surrounding composite material 1, and in particular the carbon fibres 3, was reduced. Accordingly, the flexural modulus of the composite material 1 at 130° C. reduces to 39±8 GP. This corresponds to a 54% reduction in stiffness.

Furthermore, the p(MMA-co-AAm) is reversibly transitionable between these heated and ambient temperature modes. Accordingly, when cooled back to ambient temperature the thermo-sensitive material 7 is once again capable of transferring loads in the composite material (the composite material 1 was found to have a flexural modulus of 82±2 GPa (i.e. 96% recovery)).

The above-described composite material 1 is especially beneficial for use in a morphing skin (for example on an aircraft wing) because it can be repeatedly altered between a stiff state in which it acts as a suitable aerodynamic surface, a heated state in which the stiffness of the skin is reduced to enable morphing of the wing skin into a different shape, and then cooled to stiffen the skin in that morphed shape.

An aircraft (not shown) using the composite material of the first embodiment comprises a wing skin formed from the composite material 1, a heater for heating the composite material 1 and an actuator for morphing the wing. The heater comprises an electrical power source electrically coupled to the carbon fibres 3 such that when the power source is switched on, current runs through the carbon fibres 3 and heats them up. This heat is then transmitted through to the surrounding thermo-sensitive material 7, which, once hotter than its transition temperature, softens, thereby reducing its ability to transfer loads in the composite material 1 and thus reducing the stiffness of the composite material. The actuator is arranged to exert a deforming force of the wing skin (for example via hydraulics, and/or using cams) once the stiffness has been reduced. Once the wing skin is then in the required shape, the power source is switched off and the thermo-sensitive material 7 naturally cools to below its transition temperature thereby re-stiffening the wing in its morphed shape.

In a second embodiment of the invention (not shown), the thermo-sensitive material is a liquid crystalline polymer (LCP). LCPs combine the useful properties of polymers with those of liquid crystals forming mesophases upon melting before turning into an isotropic melt. LCPs provide more phase transitions than the thermo-sensitive materials of the first embodiment because they can be changed between crystalline, liquid crystalline and isotropic melt states. The properties of the thermo-sensitive material can therefore be "switched" reversibly between more stages than those in the first and third embodiments.

There are various possible methods to coat the carbon fibres with LCP (for example dipped coating, polymerisation coating and plasma coating). The LCP-coated carbon fibres can then be manufactured into the composite material following the procedures described in the first embodiment.

Figure 2:
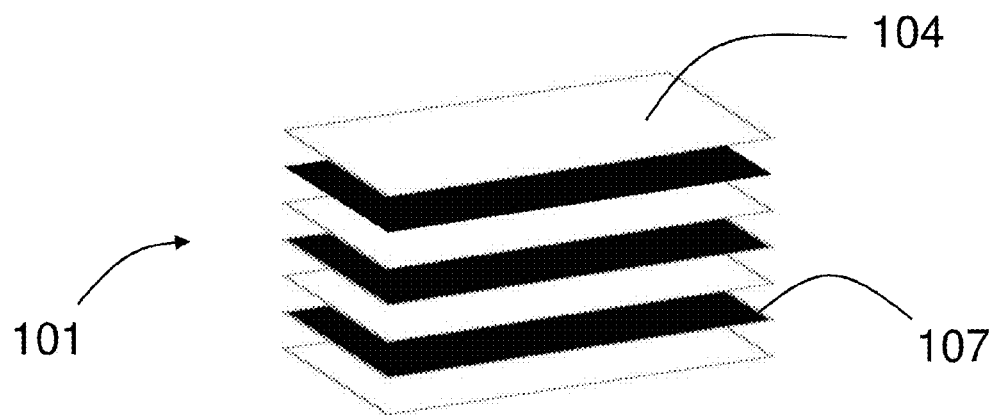
FIG. 2 is a schematic exploded perspective view of a morphing skin according to a third embodiment of the invention.

FIG. 2 is a schematic exploded view of a morphing skin according to third embodiment of the invention. The skin is located on the engine air-intake of an air-vehicle (not shown). The skin comprises a composite material 101 having interleaved layers of 125 µm Carbon-Fibre reinforced thermoset (CFRP) 104 and 130 µm polystyrene 107. The CFRP 104 is made up of unidirectional carbon fibres 103 and an epoxy matrix 105 (not separately visible in FIG. 2).

The composite material 101 is made up of seventeen alternating layers of CFRP 104 and polystyrene 107 (only some of which are shown in FIG. 2). To form the composite material, the layers were placed into a hot press and cured at 175° C. and 100 Psi for 1 hour.

Figure 3A:
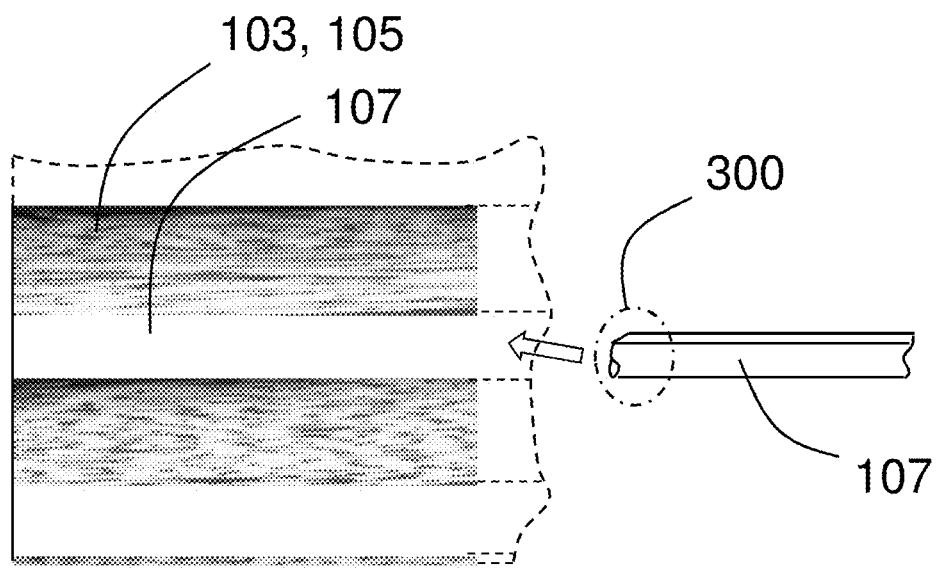
FIGS. 3a and 3b are sectional images of the morphing skin of the third embodiment of the invention in unmorphed and morphed states.
Figure 3B:
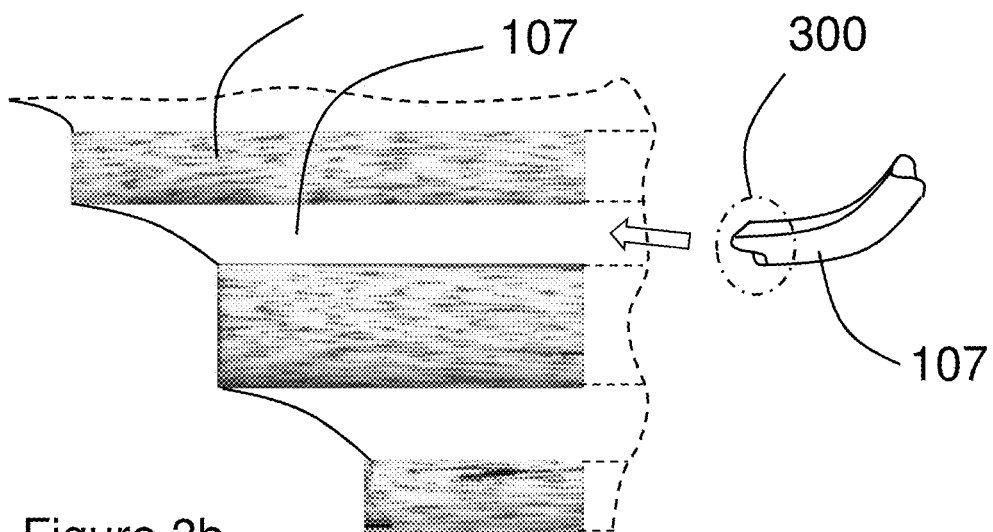

FIGS. 3a and 3b are sectional images of the composite material in a flat state (FIG. 3a) and a morphed (bent) state (FIG. 3b). The morphed state is achieved by heating the polystyrene layers 107 to 120° C. such that the elastic modulus of the polystyrene 107 reduces, thereby reducing the ability of the polystyrene to transfer loads in the composite material, and thus reducing the stiffness of the wing skin. The skin is then actuated into the deformed state, and allowed to cool (by removing the heat source) such that it stiffens in the morphed shape.

Only an end portion of the composite material providing the morphing skin 1 is shown in FIGS. 3a and 3b, showing the relative positions of the ends of the CFRP layers 103, 105 in the flat and morphed states of the polystyrene layers 107. A greater length of the polystyrene layers 107 is shown in sketches to the right in FIGS. 3a and 3b, these showing the curve of the body of the polystyrene layer 107 in the morphed state and a change in shape of the endface 300 thereof.

As shown in FIG. 3b, when the thermo-sensitive material 107 is in the heated state, the layers of CFRP 104 are able to move relative to one another, thereby reducing the stiffness of the wing skin. In this third embodiment of the invention, the flexural modulus of a test piece was measured as 65 GPa at room temperature (when the thermo-sensitive material was in ambient temperature mode) and 1 GPa at 120° C. (when the thermo-sensitive material was in heated mode). This equates to a 98% stiffness loss. Upon returning to the ambient temperature mode the flexural modulus of the composite material was measured as 65 GPa (indicating a substantially 100% stiffness recovery).

Figure 4:
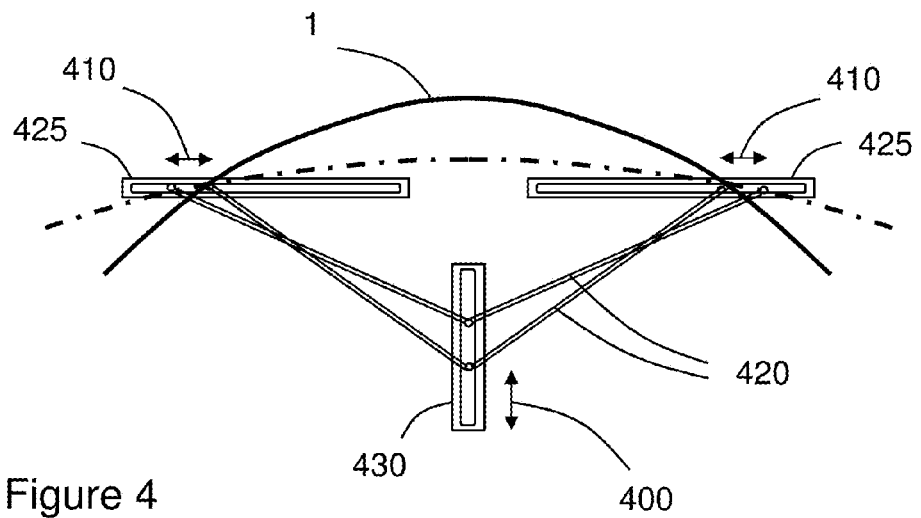
FIG. 4 shows in principle a simple actuating mechanism for use with a morphing skin of an embodiment of the invention.

Actuators for producing changes in shape of a structure such as an aircraft wing are known. FIG. 4 shows a very simple mechanical actuator for flexing a morphing skin 1 having a generally curved cross section. The actuator is based on a three slot structure in which two slots 425 are aligned and a third slot 430 is at right angles and directed towards the gap between the aligned slots 425. Shafts 420 attach to points towards the edges of the skin 1, their free ends being hingedly attached to a mounting in the third slot 430. If the mounting moves in the third slot 430, as indicated by the vertical arrow 400, it causes the attachment points of the shafts 420 to the skin 1 to move closer or further apart, as indicated by the horizontal arrows 410, thereby flexing the skin 1 to and fro, changing and reverting it between different shapes, in this case of greater and lesser curvature. Movement of the mounting of the shafts 420 in the third slot 400 might be produced for example hydraulically.

Figure 5:
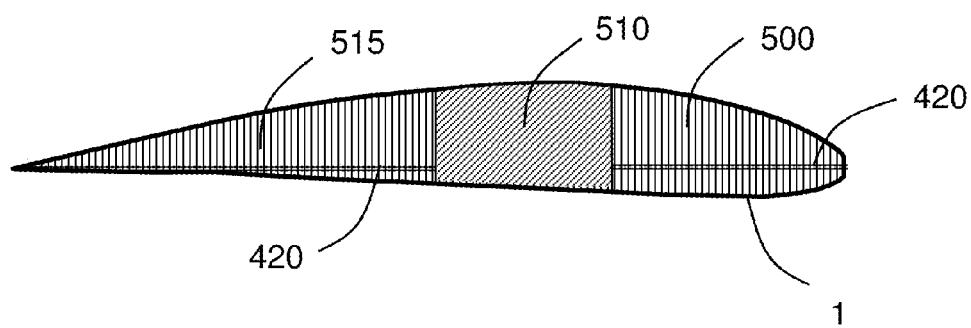
FIG. 5 shows a cross section of a wing having active trailing and leading edges incorporating a morphing skin according to an embodiment of the invention.

FIG. 5 shows a slightly different arrangement of actuator shafts 420 controlled from a rigid wingbox structure 510 in a wing and extending through forward and aft active regions 500, 510 of the wing encased in a morphing skin 1. This mechanical actuation arrangement also changes and reverts the aerodynamic wing profile while the morphing skin 1 is in heated mode.

Whilst the present invention has been described and illustrated with reference to particular embodiments, it will be appreciated by those of ordinary skill in the art that the invention lends itself to many different variations not specifically illustrated herein. For example, the heating apparatus may comprise an exhaust pipe located in proximity to the thermo-sensitive material such that some of the heat emitted from the exhaust is transferred to the thermo-sensitive material. By way of another example, the composite material need not necessarily be used in an air vehicle and could, for example, be used when manufacturing complex component parts, to move non-aerospace components such as a valve in a duct. In a further example, the skin is configurable between two heated modes; in a first heated mode only selected locations of the wing skin are heated to partially reduce the stiffness of the skin, whereas in a second heated mode additional locations of the skin are also heated to yet further reduce the stiffness and configure the skin.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A morphing skin for an air vehicle structure, the skin comprised of a composite material comprising:
   a multiplicity of fibers coated with a thermo-sensitive material which is reversibly transitionable in response to a change in temperature, between: (i) an ambient temperature mode in which the thermo-sensitive material will transfer loads in the composite material, and (ii) a heated mode in which an ability of the thermo-sensitive material to transfer loads is reduced, and
   a matrix material that incorporates said fibers coated with a thermo-sensitive material, the matrix material remaining stiff when the thermo-sensitive material is heated;
   wherein:
   the thermo-sensitive material reduces skin stiffness in the heated mode, allowing a change in shape of the skin in the heated mode and maintaining a changed shape of the skin in the ambient mode.

2. A morphing skin according to claim 1, wherein the thermo-sensitive material is a thermoplastic.

3. A morphing skin according to claim 1, wherein when in the heated mode, the thermo-sensitive material is at a temperature above a transition temperature, such that the thermo-sensitive material has changed state.

4. A morphing skin according to claim 1, wherein the composite material comprises:
   a first layer comprising said multiplicity of fibers coated with the thermo-sensitive material and incorporated into said matrix material; and
   a layer of thermo-sensitive material, adjacent to the first layer.

5. A morphing skin according to claim 4, wherein the composite material comprises:
   a plurality of layers, each of which comprises said multiplicity of fibers coated with the thermo-sensitive material and incorporated into said matrix material, the plurality of layers interleaved with layers of thermo-sensitive material.

6. A morphing skin according to claim 1 wherein the fibers in said multiplicity of fibers are uni-directional.

7. A morphing skin according to claim 1, wherein the skin comprises, or is configured for connection to, a heating apparatus for heating the thermo-sensitive material from the ambient temperature mode to the heated mode.

8. A morphing skin according to claim 7, wherein the fibers in said multiplicity of fibers are electrically conductive and the heating apparatus is configured to pass a current through the multiplicity of fibers to heat the thermo-sensitive material.

9. A morphing skin according to claim 1, wherein the fibers in said multiplicity of fibers are carbon fibers.

10. A morphing skin according to claim 1, comprising: an actuator for changing and reverting a shape of the skin when the thermo-sensitive material is in the heated mode.

11. A method of morphing a skin on an air vehicle, comprising:
    (i) heating the skin, the skin being configured to reversibly reduce in stiffness in reaction to an increase in temperature;
    (ii) deforming the skin; and
    (iii) cooling the skin in the deformed state, the skin being configured to return to higher stiffness in reaction to a decrease in temperature;
    wherein the skin comprises a composite material comprised of a multiplicity of fibers coated with a thermo-sensitive material, and a matrix material that incorporates said fibers coated in a thermo-sensitive material;
    wherein the thermo-sensitive material is reversibly transitionable in response to a change in temperature, between: (i) an ambient temperature mode in which the thermo-sensitive material will transfer loads in the composite material, and (ii) a heated mode in which an ability of the thermo-sensitive material to transfer loads is reduced, thereby reducing skin stiffness;

the matrix material remaining stiff when the thermo-sensitive material is heated, and the thermo-sensitive material thereby reducing a stiffness of the composite material in the heated mode, allowing a change in shape of the skin in the heated mode, and maintaining a changed shape of the skin in the ambient mode.

12. A method according to claim 11 wherein heating of the skin comprises passing an electrical current through the multiplicity of fibers.

13. An article comprising a composite material which comprises:

a multiplicity of fibers coated with a thermo-sensitive material, and a matrix material that incorporates said fibers coated in a thermo-sensitive material;

wherein the thermo-sensitive material is reversibly transitionable in response to a change in temperature, between: (i) an ambient temperature mode in which the thermo-sensitive material will transfer loads in the composite material; and (ii) a heated mode in which an ability of the material to transfer the loads is reduced, thereby reducing a stiffness of the composite material;

the matrix material remaining stiff when the thermo-sensitive material is heated, the thermo-sensitive material thereby reducing a stiffness of the composite material in the heated mode, allowing a change in shape of the article in the heated mode, and maintaining a changed shape of the article in the ambient mode.

14. The morphing skin according to claim 1, wherein said thermo-sensitive material is a thermoplastic polymer and said matrix is an epoxy matrix.

15. The morphing skin according to claim 14, wherein said thermoplastic polymer is selected from poly(methyl methacrylate-co-acrylamide), polystyrene, and liquid crystal polymer.

* * * * *